(12) United States Patent
Ferrant et al.

(10) Patent No.: US 6,316,986 B1
(45) Date of Patent: Nov. 13, 2001

(54) METHOD AND DEVICE FOR VOLTAGE MULTIPLICATION

(75) Inventors: Richard Ferrant, Saint Ismier; Francois Jacquet, Grenoble, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/578,780

(22) Filed: May 25, 2000

(30) Foreign Application Priority Data

May 28, 1999 (FR) .................................................. 99 06797

(51) Int. Cl.[7] ........................................................ G05F 1/10
(52) U.S. Cl. ............................................................ 327/536
(58) Field of Search .................................... 327/530, 534, 327/536, 537, 564, 565, 566

(56) References Cited

U.S. PATENT DOCUMENTS 4,000,412  12/1976  Rosenthal et al. ................... 307/208
4,259,686   3/1981  Suzuki et al. ........................ 307/262
5,757,223   5/1998  Nevin .................................. 327/536

FOREIGN PATENT DOCUMENTS 0 461 717 A1  12/1991  (EP) .
2 759 507      8/1998  (FR) .

Primary Examiner—Jeffrey Zweizig
(74) Attorney, Agent, or Firm—Lisa K. Jorgenson; Jose Gutman; Fleit, Kain, Gibbons, Gutman & Bongini P. L.

(57) ABSTRACT

At a charging phase, a capacitor (PC) is charged through two complementary charging transistors (TR1, TR2) connected in series to a first terminal (T1) of the capacitor (PC). At a voltage multiplication phase, an input voltage (Vdd) is delivered to the second terminal (T2) of the capacitor and an output voltage (Vout), increased with respect to the input voltage, is recovered at the first terminal (T1) of the, capacitor, and the capacitor is discharged during a discharging phase. During three phases, the substrate (BK2) of the charging transistor (TR2) directly connected to the first terminal (T1) of the capacitor is slaved to the source (S2) of this same charging transistor (TR2), while still keeping the source-substrate junction and the drain-substrate junction of this charging transistor (TR2) reverse-biased.

24 Claims, 3 Drawing Sheets

METHOD AND DEVICE FOR VOLTAGE MULTIPLICATION

CROSS-REFERENCE TO RELATED APPLICATIONS

This application is based upon and claims priority from prior French Patent Application No. 99-06797, filed May 28, 1999, the entire disclosure of which is herein incorporated by reference.

BACKGROUND OF THE INVENTION

1. Field of the Invention

This invention generally relates to integrated circuits, and more particularly to devices allowing voltage multiplication.

2. Description of the Prior Art

The invention finds many applications in the field of microelectronics, and in particular in the decoding of rows of DRAM memory cells, or else in the production of charge pump devices.

The supply voltages of integrated circuits continue to fall with the increase in etching fineness. Thus, for a 1.2 micron technology, the supply voltage is 5 volts, whereas it is 2.5 volts for a 0.25 micron technology and 1.8 volts for a 0.18 micron technology. Consequently, placed with this technological trend, it is becoming increasingly necessary to use voltage multipliers in order to be able to benefit from voltages higher than the supply voltages, so that logic devices can, for example, be effectively controlled with logic signals whose high-state level is high enough.

However, the conventional physical parameters of electronic components, particularly the threshold voltage, have decreased less than the supply voltages and consequently represent a higher percentage of the supply voltage the higher the etching fineness. Thus, by way of indication, for a 1.2 micron technology, the nominal threshold voltage of a transistor represents 15% of the supply voltage, whereas it represents 30% of this supply voltage for a 0.18 micron technology.

Furthermore, these physical parameters are increasingly limiting the performance of circuits, and in particular make voltage multipliers less effective.

These drawbacks will now be more clearly understood upon examining FIG. 1 which shows a voltage multiplier device of the prior art.

This voltage multiplier device VMD of the prior art conventionally comprises an input terminal IT for receiving an input voltage, an output terminal OT for delivering an output voltage increased with respect to the input voltage, and a capacitor PC, usually called by those skilled in the art a "pumping capacitor", a first terminal T1 of which is connected to the output terminal OT and a second terminal T2 of which is connected to the input terminal IT.

The VMD device also includes means for charging the capacitor PC. These charging means conventionally consist of two complementary insulated-gate field-effect transistors, referenced TR1 and TR2, connected in series between a first supply terminal ST1 and the first terminal T1 of the capacitor PC. In the rest of the text, these two complementary transistors will be referred to by the name "charging transistors". Here, the first charging transistor TR1 is a p-channel transistor (PMOS transistor), the source S1 of which is connected to the first supply terminal ST1 which is connected in this case to the supply voltage Vdd. The substrate BK1 of this transistor TR1 (also referred to by the name "bulk") is conventionally connected to the source S1. The drain D1 of this first charging transistor is connected to the drain D2 of the second charging transistor TR2 which is in this case an n-channel transistor (nMOS transistor). The substrate BK2 of this second charging transistor is conventionally connected to ground and its source S2 is connected to the first terminal of the capacitor PC and consequently to the output terminal OT.

The voltage multiplier VMD also includes means for discharging the pumping capacitor PC. These discharging means are formed here by a transistor called a "discharging transistor", TR3, which in this case is an nchannel transistor. The drain D3 of this transistor TR3 is connected to the first terminal T1 of the pumping capacitor. Its substrate BK3 is conventionally connected to ground and its source S3 is connected to the second supply terminal ST2 which in this case is connected to ground.

The operation of such a voltage multiplier device is as follows.

During a first phase of charging the pumping capacitor PC, the charging transistors TR1 and TR2 are turned on by applying suitable control voltages to the respective gates G1 and G2 of these transistors and the discharging transistor TR3 is turned off by applying a suitable control voltage to the gate G3.

The second terminal T2 of the pumping capacitor is, for example, grounded and the capacitor PC charges due to the rise in voltage of the node T1 up to the value Vdd−Vt, where Vt denotes the threshold voltage of the nMOS transistor TR2 (it has been assumed here that the control voltage on the gate G2 was equal to Vdd).

This charging phase is followed by a voltage multiplication phase in which an input voltage, for example the supply voltage Vdd, is delivered to the second terminal T2 of the capacitor and an output voltage Vout, increased with respect to the input voltage, is recovered at the first terminal T1 of the capacitor. More specifically, the output voltage Vout is given by the formula (I):

$$Vout = Vdd - Vt + \alpha Vdd = Vdd(1+\alpha) - Vt \quad (I)$$

in which α denotes a coefficient which in practice is less than 1 because of the presence of stray capacitances (this is because in the absence of stray capacitances the coefficient a would be 1).

Moreover, those skilled in the art know that the threshold voltage Vt of a field-effect transistor, in particular the transistor TR2, is defined by the formula (II):

$$Vt = Vt_0(1+\beta) \quad (II)$$

in which $Vt_0$ denotes the nominal threshold voltage and β denotes a coefficient representative of the substrate effect applied to the transistor.

More specifically, the substrate effect is manifested in an nMOS transistor by biasing the source of this transistor with a voltage greater than the substrate voltage. Furthermore, the greater this voltage difference the greater the coefficient β, and consequently the greater the threshold voltage Vt.

However, when the substrate BK2 of the transistor TR2 is connected to ground and the output voltage Vout is high, the substrate effect is large, thereby correspondingly reducing the value of this output voltage and therefore reducing the effectiveness of the voltage multiplier.

Once this voltage multiplication phase has been completed, the pumping capacitor PC is discharged by turning the transistor TR3 on, and then the cycle starts over again.

Accordingly, there exists a need for overcoming the disadvantages of the prior art as discussed above.

SUMMARY OF THE INVENTION

According to a preferred embodiment of the present invention, a solution to the problem of effectiveness of a voltage multiplier is provided.

A main advantage of the invention is the ability to minimize as far as possible the substrate effect and consequently to increase the performance of voltage multipliers, most particularly for a low supply voltage, for example in a 0.18 micron technology, or even beyond.

The invention therefore provides a method of voltage multiplication, comprising a charging phase in which a capacitor is charged through two complementary charging transistors connected in series to a first terminal of the capacitor, a voltage multiplication phase in which an input voltage is delivered to the second terminal of the capacitor and an output voltage, increased with respect to the input voltage, is recovered at the first terminal of the capacitor, and a phase of discharging the capacitor.

According to a general feature of the invention, during the three phases, the substrate of the charging transistor directly connected to the first terminal of the capacitor is slaved to the source of this same charging transistor, while still keeping the source-substrate junction and the drain-substrate junction of this charging transistor reverse-biased.

In other words, the slaving according to the invention makes it possible, when the slaved-substrate charging transistor is an n-channel transistor (nMOS transistor), for the substrate voltage of this transistor to follow the rise in the output voltage, that is to say the voltage at the first terminal of the capacitor, while always remaining close to but less than this output voltage, and consequently to the source voltage of the slaved-substrate transistor. During the discharge phase, the slaving according to the invention makes it possible for the substrate voltage of the transistor to precede the drop in output voltage, whilst still also always remaining close to but less than this output voltage.

On the other hand, when the slaved-substrate transistor is a p-channel transistor (PMOS transistor), the slaving according to the invention makes it possible for the source voltage of this transistor always to remain close to but slightly less than the substrate voltage of this transistor.

Thus, the slaving according to the invention makes it possible, by reducing as far as possible the source-substrate voltage difference of the charging transistor, to minimize as far as possible the substrate effect and consequently to increase the effectiveness of the voltage multiplier. Furthermore, the fact of keeping the source-substrate junction and the drain-substrate junction of this slaved-substrate charging transistor reverse-biased makes it possible for this transistor to retain its isolating function and to prevent a partial leakage of charge from the pumping capacitor into the well of the other charging transistor (for example the pMOS transistor).

According to one mode of implementation of the invention, the source-substrate junction of this charging transistor is kept slightly reverse-biased by applying, between the source and the substrate, a bias voltage at most equal to a threshold voltage of an insulated-gate field-effect transistor. This is because, of course, the smaller the source-substrate voltage difference the more effective the voltage multiplier, but the greater the risk of increasing the complexity of operation. Furthermore, it has been considered suitable to set this source-substrate voltage difference to a threshold voltage of an insulatedgate field-effect transistor, this being a good compromise between the desired effectiveness of the voltage multiplier and the ease of operation. This is because such an operation, as will be seen in greater detail below, simply requires the use of an auxiliary insulated-gate field-effect transistor, of which it is possible, of course, to choose the characteristics so as to obtain as low a threshold voltage as possible.

Moreover, the drain-substrate junction of this slaved-substrate charging transistor is kept reverse-biased by charging, for example, the pumping capacitor with a supply voltage less than or equal to a predetermined threshold voltage, for example 1.8 volts in 0.18 micron technology, and by delivering an input voltage also equal to or less than a predetermined threshold voltage. It is possible, for example, to choose an input voltage equal to the supply voltage. The desired aim is to obtain a substrate voltage such that the drain-substrate diode must not be forward-biased. Those skilled in the art will be able to choose the various parameters of the device in order to achieve this result, taking into account each envisaged application.

The subject of the invention is also a voltage multiplier device comprising an input terminal for receiving an input voltage, an output terminal for delivering an output voltage increased with respect to the input voltage, a capacitor having a first terminal connected to the output terminal and a second terminal connected to the input terminal, a first charging transistor connected to a first supply terminal, a second charging transistor connected to the first terminal of the capacitor, these two charging transistors being complementary and connected in series, and a discharging transistor connected between the said first terminal of the capacitor and a second supply terminal.

According to a general feature of the invention, the device furthermore comprises slaving means capable of slaving the substrate of the second charging transistor to its source, while keeping the source-substrate junction and the drain-substrate junction of this second transistor reverse-biased.

According to one embodiment of the invention, the slaving means comprise, on the one hand, a first auxiliary insulated-gate field-effect transistor connected between the first terminal of the capacitor and the substrate of the second charging transistor, the gate of this first auxiliary transistor also being connected to the first terminal of the capacitor.

On the other hand, the slaving means also comprise a second auxiliary insulated-gate field-effect transistor connected between the said second supply terminal (for example ground, when this is an nMOS transistor) and the substrate of the second charging transistor, the gate of this second auxiliary transistor being connected to the gate of the discharging transistor.

According to one embodiment of the invention, the supply voltage delivered to one of the supply terminals (for example the first one) is less than or equal to a predetermined threshold voltage (for example 1.8 volts) and the input voltage is equal to the supply voltage.

In order to allow the substrate to be slaved to the source, the second charging transistor is advantageously placed in a semiconductor well separate from the substrate within which the said device is produced. This is generally the case when the slaved-substrate charging transistor is a transistor of the pMOS type.

On the other hand, when the second charging transistor is an nchannel transistor (an nMOS transistor), it is appropriate to produce it in a well using, for example, a so-called "triple-well" technology.

BRIEF DESCRIPTION OF THE DRAWINGS

Further advantages and features of the invention will emerge upon examination of the detailed description of one embodiment and of one mode of implementation, these being in no way limiting, and of the appended drawings.

DESCRIPTION OF A PREFERRED EMBODIMENT

Figure 1:
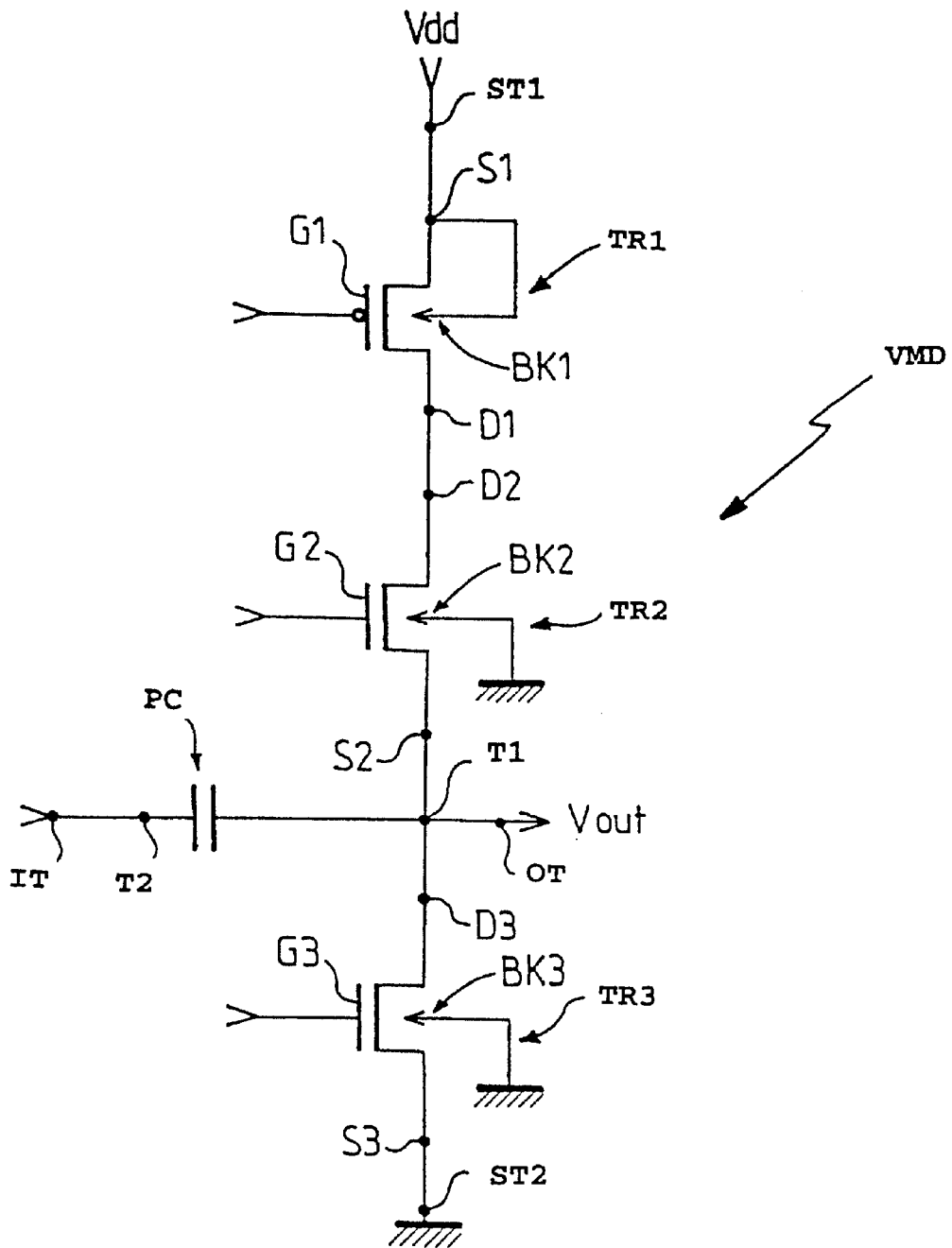
FIG. 1, already described, schematically illustrates a voltage multiplier device according to the prior art.
Figure 2:
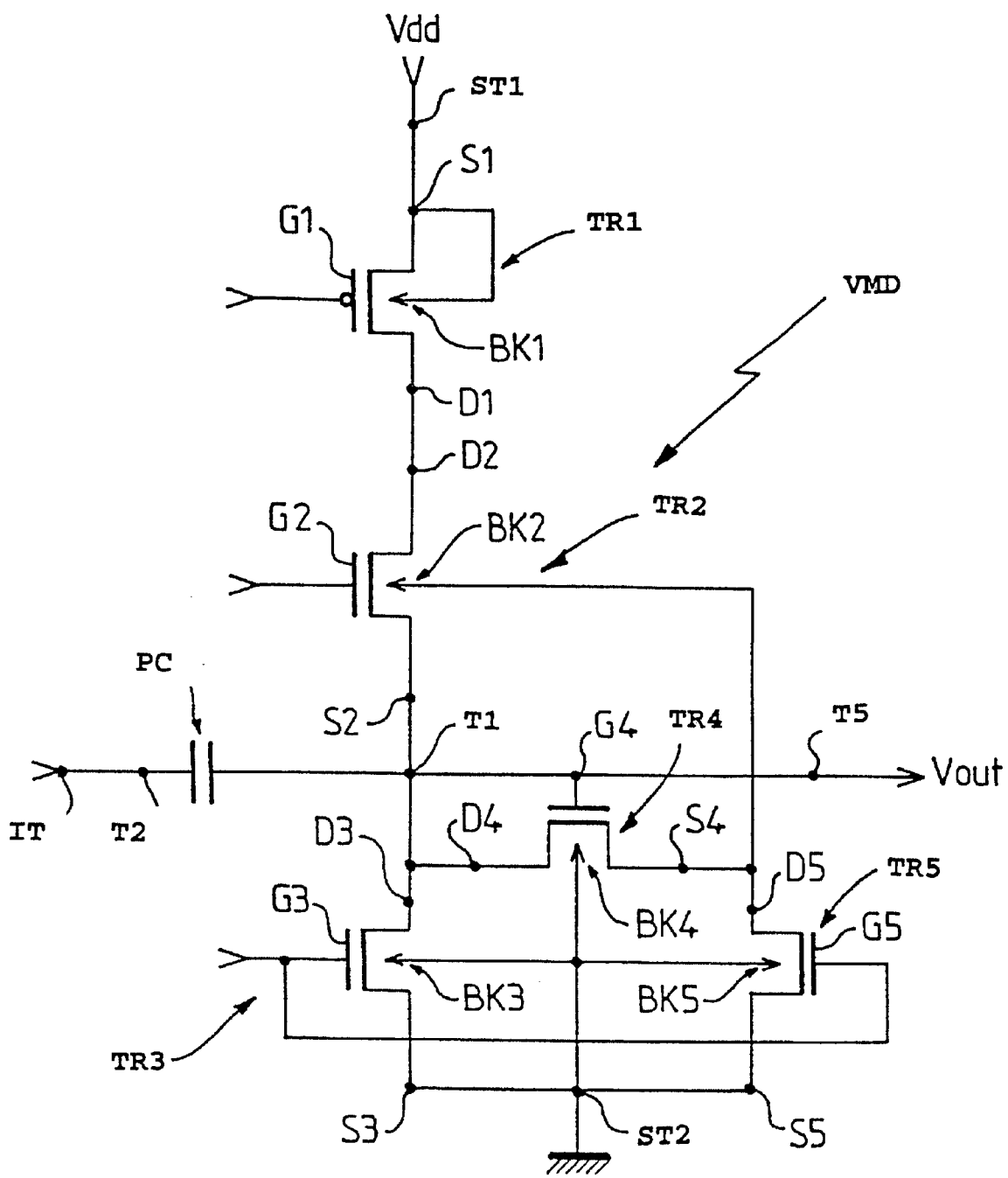
FIG. 2 schematically illustrates one embodiment of a voltage multiplier device according to the invention.

Compared with the device in FIG. 1, the VMD device according to the invention, as illustrated in FIG. 2, also includes slaving means capable of slaving the substrate BK2 of the second charging transistor to its source S2, while keeping the source-substrate junction and the drain-substrate junction of this second transistor TR2 reverse-biased.

These slaving means are composed here of a first auxiliary insulatedgate field-effect transistor TR4, the drain D4 and the gate G4 of which are connected together to the first terminal T1 of the pumping capacitor PC and consequently to the output terminal OT of the device. As regards the source S4 of this nMOS transistor TR4, this is connected to the substrate BK2 of the second charging transistor TR2.

The slaving means moreover include a second auxiliary nMOS transistor, referenced TR5, the drain D5 of which is connected to the substrate BK2 of the second discharging transistor and the source S5 of which is connected to the second supply terminal ST2, in this case connected to ground. Moreover, the gate G5 of this second auxiliary transistor is connected to the gate G3 of the discharging transistor TR3. Consequently, these two transistors TR3 and TR5 are controlled simultaneously.

Finally, the substrates BK3, BK4 and BK5 of the three nMOS transistors TR3, TR4 and TR5 are connected to ground.

At the phase of charging the pumping capacitor PC, the transistors TRI and TR2 are turned on. To do so, the supply voltage Vdd is applied to the gate G2 of the transistor TR2. The transistors TR3 and TR5 are turned off, for example by grounding the gates G3 and G5. At the start of this charging phase, which corresponds to the end of the previous discharging phase, the voltage at the source S4 of the first auxiliary transistor TR4 is zero.

The node T1 then charges up to the voltage $Vdd-Vt_2$, where $Vt_2$ denotes the threshold voltage of the transistor TR2, and the voltage at the source S4 of the transistor TR4, and consequently the voltage of the substrate BK2 of the transistor TR2, rises up to the value $Vdd-Vt_2-Vt_4$, where $Vt_4$ denotes the threshold voltage of the transistor TR4.

At the voltage multiplication phase, that is to say when the supply voltage Vdd is delivered to the input terminal IT, the voltage at the node T1 rises almost instantly to the value $2Vdd-Vt_2$ (if the stray capacitances are ignored, namely coefficient $\alpha=1$).

The voltage at the source S4 of the transistor TR4, and consequently the voltage of the substrate BK2 of the transistor TR2, follows the source voltage of the transistor TR2 and rises up to the value $2Vdd-Vt_2-Vt_4$.

Consequently, during this phase, the voltage of the substrate BK2 of the transistor TR2 follows the source voltage of this transistor TR2, while remaining close to the source voltage within the threshold voltage $Vt_4$, but still remaining less than the source voltage of the transistor TR2.

Thus, the source-substrate diode of the transistor TR2 remains off, thereby preventing partial leakage of charges from the pumping capacitor PC into the well of the transistor TR1 via the transistor TR2. This transistor TR2 thus retains its isolating function.

It should be noted here that the presence of the transistor TR4 is absolutely essential in order to slave the substrate of the transistor TR2 to its source while keeping the source-substrate diode of the transistor TR2 off. This is because, if the source S2 of the transistor TR2 had simply been connected to the substrate BK2, at the voltage multiplication phase, that is to say when the voltage at the source S2 rises up to 2Vdd–Vt, the substrate voltage of the transistor TR2 becomes greater than the voltage at the drain D2, which therefore forward-biases the drain-substrate junction and causes a partial loss of charges from the capacitor through the transistor TR1.

In this regard, it should be noted here that, in the particularly simple embodiment illustrated in FIG. 2, the choice of supply voltage Vdd is important so as also to prevent, in the voltage multiplication phase, the source voltage S4 and consequently the voltage of the substrate BK2 from also becoming greater than the voltage of the drain D2.

A voltage Vdd of less than or equal to 1.8 volts is suitable for this purpose. This is because, if the stray capacitances are ignored (coefficient $\alpha=1$) and if identical transistors TR2 and TR4 are chosen so as to have threshold voltages of about 0.7 volts, at the start of the voltage multiplication phase a source S4 voltage, and consequently a substrate BK2 voltage, equal to 2Vdd–2Vt (=2.2 volts) is obtained for a voltage at the drain D2 of Vdd, and consequently equal to 1.8 volts. Consequently, the difference between the substrate voltage and the drain voltage is equal to 0.4 volts, a value which allows the drain-substrate diode of the transistor TR2 to be kept reversebiased. The transistor TR2 again retains its isolating function.

Of course, greater supply voltages could also be used as long as either the value of the input voltage at the terminal T2 of the capacitor is reduced or the voltage at the drain D2 is increased by adding additional components.

Those skilled in the art will know how to choose from all these possibilities in order to obtain the desired result, that is to say to keep the drain-substrate diode off, depending on the envisaged application.

By way of indication, the device illustrated in FIG. 2 also operates in 0.25 micron technology (Vdd=2.5 volts). This is because, if the stray capacitances are taken into account ($\alpha=0.8$), the source S4 voltage reaches the value 3.1 volts (Vdd $(1+\alpha)-2Vt$, with Vt=0.7 volts), whereas the voltage at the drain D2 remains equal to 2.5 volts.

At the phase of discharging the pumping capacitor PC, the transistors TR3 and TR5 are turned on. Consequently and since the node TI is charged by the pumping capacitor PC, the voltage of the source S4 and consequently the voltage of the substrate BK2 will decrease more rapidly than the voltage at the node T1, and consequently more rapidly than the voltage of the source S2 of the transistor TR2. As a consequence, even during this phase of the cycle, the substrate BK2 remains that one of the nodes of the transistor TR2 having the lowest voltage, and consequently also having at this end of the cycle a voltage below the substrate voltage, thereby making it possible again to keep the source-substrate diode and the drain-substrate diode off.

The embodiment that has just been described, providing the use of an n-channel transistor TR2, is not compatible with a so-called "single-well" technology well known to those skilled in the art.

It will be recalled here, on a point of information, that in a technology of the single-well type it is conventional to produce, within the general substrate of the semiconductor wafer in which the circuit is produced (generally a p-type substrate), an n-type well acting as substrate for the PMOS transistors. On the other hand, the nMOS transistors are produced directly by implantation in this general substrate of the wafer. More specifically, the substrate contact connection of the nMOS transistor is formed by a $p^+$-type well implanted in this general substrate. However, biasing the substrate BK2 of the transistor TR2, as indicated previously, would amount to biasing the entire substrate of the wafer in the same way, something which might not be appropriate for other nMOS transistors produced within this wafer and relating to other components.

This is the reason why, when the transistor TR2 is an nMOS transistor, it is necessary for the latter to be produced in a well isolated from the general substrate of the wafer.

Figure 3:
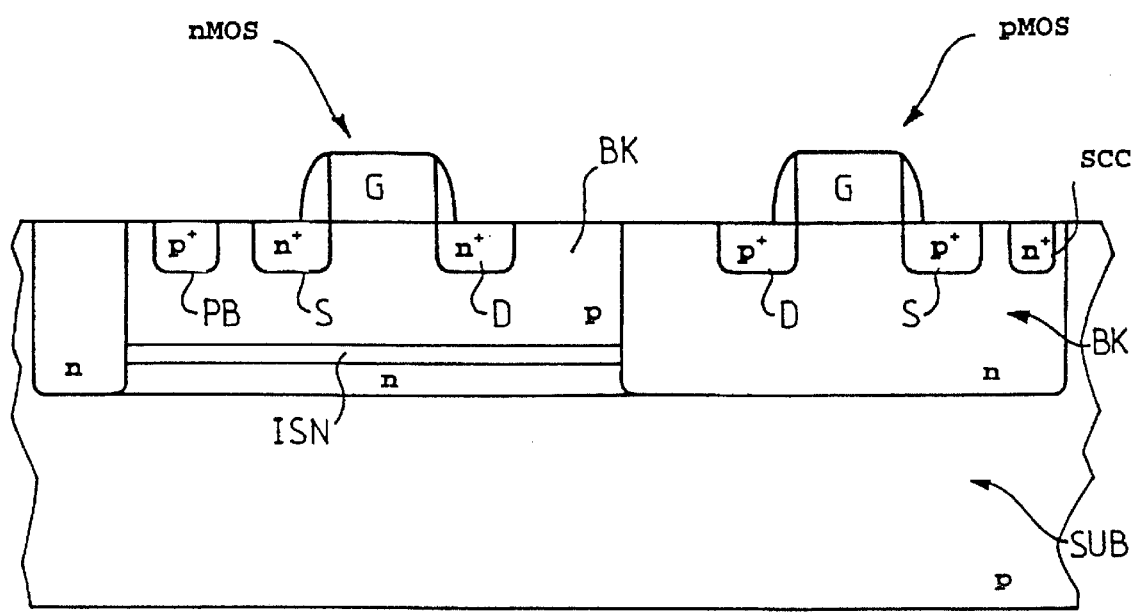
FIG. 3 schematically illustrates a so-called "triple-well" fabrication technology that can be used in the invention.

A so-called "triple-well" construction, well known to those skilled in the art and illustrated in FIG. 3, allows the invention to be realized.

More specifically, as illustrated in this FIG. 3, the nMOS transistors are this time produced within another p-type well (referenced BK) which is isolated laterally from the general substrate of the wafer SUB by an n-type well and isolated vertically from the substrate SUB by an insulating silicon layer ISN deposited on another n-type silicon layer. Thus, it is easily possible to apply, to the substrate contact connection SCC, a substrate voltage slaved to the source of the nMOS transistor without thereby biasing the general substrate of the wafer SUB in the same way.

Of course, everything that has been described above in the case of a p-channel transistor TR1 and n-channel transistors TR2, TR3, TR4 and TR5 also applies to transistors of the type having the opposite conductivity, that is to say to an n-channel transistor TR1 and to p-channel transistors TR2, TR3, TR4 and TR5. Those skilled in the art will readily know how to modify the parameters of the device taking into account these transistors. By way of indication it should be noted that, in this case, slaving the substrate of the transistor TR2 to its source results in a source voltage close to the substrate voltage, but always less than this substrate voltage. Such a device makes it possible to obtain negative voltages which are greater in absolute value than a negative supply voltage.

Moreover, the invention may be applied to a more "relaxed" technology, for example 1.2 micron technology, using a nominal supply voltage of 5 volts as long as, for example, a divider bridge is provided which results at the terminal ST1 in a low enough voltage Vdd compatible with keeping the junctions reverse-biased, for example a voltage Vdd of 1.8 volts or 2.5 volts. This having been said, the invention is completely effective at a low nominal supply voltage, that is to say for 0.18 micron technologies and beyond.

While there has been illustrated and described what are presently considered to be the preferred embodiments of the present invention, it will be understood by those of ordinary skill in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

Although specific embodiments of the invention have been disclosed, it will be understood by those having ordinary skill in the art that changes can be made to the specific embodiments, and equivalents may be substituted, without departing from the spirit and scope of the invention. Furthermore, an embodiment of the present invention may not include all of the features described above. The scope of the invention is not to be restricted, therefore, to the specific embodiments, and it is intended that the appended claims cover any and all such applications, modifications, and embodiments within the scope of the present invention.

What is claimed is:

1. A method of voltage multiplication, comprising the steps of:
    in a charging phase, charging a capacitor through two complementary charging transistors connected in series to a first terminal of the capacitor;
    in a voltage multiplication phase, delivering an input voltage to a second terminal of the capacitor and an output voltage, increased with respect to the input voltage, is recovered at the first terminal of the capacitor; and
    in a discharging phase, discharging the capacitor, and wherein during the three phases the substrate of the charging transistor directly connected to the first terminal of the capacitor is slaved to the source of this same charging transistor, while still keeping the source-substrate junction and the drain-substrate junction of the charging transistor reverse-biased.

2. The method according to claim 1, wherein the said slaved-substrate charging transistor is an n-channel transistor and in that, during the said three phases, the source voltage remains slightly greater than the substrate voltage of this transistor.

3. The method according to claim 1, wherein the said slaved-substrate charging transistor is a p-channel transistor and in that, during the said three phases, the source voltage remains slightly less than the substrate voltage of this transistor.

4. The method according to claim 1, wherein the drain-substrate junction of the charging transistor is kept reverse-biased by charging the capacitor with a supply voltage less than a predetermined threshold voltage and by delivering an input voltage less than a predetermined threshold voltage.

5. The method according to claim 4, wherein the said slaved-substrate charging transistor is an n-channel transistor and in that, during the said three phases, the source voltage remains slightly greater than the substrate voltage of this transistor.

6. The method according to claim 4, wherein the said slaved-substrate charging transistor is a p-channel transistor and in that, during the said three phases, the source voltage remains slightly less than the substrate voltage of this transistor.

7. The method according to claim 1, wherein the source-substrate junction of the charging transistor is kept slightly reverse-biased by applying, between the source and the substrate, a bias voltage at most equal to a threshold voltage of an insulated-gate field-effect transistor.

8. The method according to claim 7, wherein the said slaved-substrate charging transistor is an n-channel transistor and in that, during the said three phases, the source voltage remains slightly greater than the substrate voltage of this transistor.

9. The method according to claim 7, wherein the said slaved-substrate charging transistor is a p-channel transistor and in that, during the said three phases, the source voltage remains slightly less than the substrate voltage of this transistor.

10. The method according to claim 7, wherein the drain-substrate junction of the charging transistor is kept reverse-biased by charging the capacitor with a supply voltage less than a predetermined threshold voltage and by delivering an input voltage less than a predetermined threshold voltage.

11. The method according to claim 10, wherein the said slaved-substrate charging transistor is an n-channel transistor and in that, during the said three phases, the source voltage remains slightly greater than the substrate voltage of this transistor.

12. The method according to claim 10, wherein the said slaved-substrate charging transistor is a p-channel transistor and in that, during the said three phases, the source voltage remains slightly less than the substrate voltage of this transistor.

13. A voltage multiplier device comprising:
an input terminal for receiving an input voltage;
an output terminal for delivering an output voltage increased with respect to the input voltage;
a capacitor having a first terminal connected to the output terminal and a second terminal connected to the input terminal;
a first charging transistor connected to a first supply terminal;
a second charging transistor connected to the first terminal of the capacitor, the first and second charging transistors being complementary and connected in series;
a discharging transistor connected between the said first terminal of the capacitor and a second supply terminal; and
slaving means capable of slaving the substrate of the second charging transistor to its source, while keeping the source-substrate junction and the drain-substrate junction of the second transistor reverse-biased.

14. The device according to claim 13, wherein the second charging transistor is placed in a semiconductor well separate from the substrate within which the said device is produced.

15. The device according to claim 13, wherein the second charging transistor is an n-channel transistor produced in a triple-well technology.

16. The device according to claim 13, wherein the slaving means comprise:
a first auxiliary insulated-gate field-effect transistor connected between the first terminal of the capacitor and the substrate of the second charging transistor, a gate of the first auxiliary transistor also being connected to the first terminal of the capacitor; and
a second auxiliary insulated-gate field-effect transistor connected between the said second supply terminal and the substrate of the second charging transistor, the gate of the second auxiliary transistor being connected to the gate of the discharging transistor.

17. The device according to claim 16, wherein the second charging transistor is an n-channel transistor produced in a triple-well technology.

18. The device according to claim 16, wherein the second charging transistor is placed in a semiconductor well separate from the substrate within which the said device is produced.

19. The device according to claim 16, wherein the supply voltage delivered to one of the supply terminals is less than a predetermined threshold voltage and the input voltage is equal to the supply voltage.

20. The device according to claim 19, wherein the second charging transistor is an n-channel transistor produced in a triple-well technology.

21. The device according to claim 19, wherein the second charging transistor is placed in a semiconductor well separate from the substrate within which the said device is produced.

22. The device according to one of claims 21 wherein the second charging transistor is an n-channel transistor produced in a triple-well technology.

23. A computer system comprising
a memory device including a voltage multiplying circuit including:
an input terminal for receiving an input voltage;
an output terminal for delivering an output voltage increased with respect to the input voltage;
a capacitor having a first terminal connected to the output terminal and a second terminal connected to the input terminal;
a first charging transistor connected to a first supply terminal;
a second charging transistor connected to the first terminal of the capacitor, the first and second charging transistors being complementary and connected in series;
a discharging transistor connected between the said first terminal of the capacitor and a second supply terminal; and
slaving means capable of slaving the substrate of the second charging transistor to its source, while keeping the source-substrate junction and the drain-substrate junction of the second transistor reverse-biased.

24. The computer system according to claim 23, wherein the slaving means comprise:
a first auxiliary insulated-gate field-effect transistor connected between the first terminal of the capacitor and the substrate of the second charging transistor, a gate of the first auxiliary transistor also being connected to the first terminal of the capacitor; and
a second auxiliary insulated-gate field-effect transistor connected between the said second supply terminal and the substrate of the second charging transistor, the gate of the second auxiliary transistor being connected to the gate of the discharging transistor.

* * * * *